US012108806B2

(12) United States Patent
Bohne et al.

(10) Patent No.: US 12,108,806 B2
(45) Date of Patent: Oct. 8, 2024

(54) METHOD FOR PRODUCING A VAPORIZING DEVICE, VAPORIZING DEVICE AND INHALER, PREFERABLY AN ELECTRONIC CIGARETTE PRODUCT

(71) Applicant: KÖRBER TECHNOLOGIES GMBH, Hamburg (DE)

(72) Inventors: Sven Bohne, Hamburg (DE); André Born, Neuschoenningstedt (DE); Hoc Khiem Trieu, Westergellersen (DE)

(73) Assignee: KÖRBER TECHNOLOGIES GMBH, Hamburg (DE)

( * ) Notice: Subject to any disclaimer, the term of this patent is extended or adjusted under 35 U.S.C. 154(b) by 423 days.

(21) Appl. No.: 17/600,454

(22) PCT Filed: Mar. 17, 2020

(86) PCT No.: PCT/EP2020/057257
§ 371 (c)(1),
(2) Date: Sep. 30, 2021

(87) PCT Pub. No.: WO2020/212050
PCT Pub. Date: Oct. 22, 2020

(65) Prior Publication Data
US 2022/0160049 A1     May 26, 2022

(30) Foreign Application Priority Data

Apr. 15, 2019    (DE) ..................... 10 2019 109 883.1

(51) Int. Cl.
*A24F 40/70*    (2020.01)
*A24F 40/10*    (2020.01)
(Continued)

(52) U.S. Cl.
CPC .............. *A24F 40/70* (2020.01); *A24F 40/10* (2020.01); *A24F 40/40* (2020.01); *A24F 40/46* (2020.01);
(Continued)

(58) Field of Classification Search
None
See application file for complete search history.

(56) References Cited

U.S. PATENT DOCUMENTS

| 5,573,692 A | 11/1996 | Das et al. |
| 5,649,554 A | 7/1997 | Sprinkel et al. |
| 6,056,186 A * | 5/2000 | Dickson .............. H01L 23/3735 |
| | | 228/195 |
| 9,555,199 B2 | 1/2017 | Buchberger |

(Continued)

FOREIGN PATENT DOCUMENTS

| AT | 509 046 B1 | 6/2011 |
| CN | 104768407 A | 7/2015 |

(Continued)

OTHER PUBLICATIONS

First Examination Report issued by the German Patent and Trademark Office on Feb. 27, 2020 with respect to the German priority application No. DE 10 2019 109 883.1.

(Continued)

*Primary Examiner* — Katherine A Will
(74) *Attorney, Agent, or Firm* — SALIWANCHIK, LLOYD & EISENSCHENK

(57) ABSTRACT

A method for manufacturing a vaporizer device for an inhaler, preferably for an electronic cigarette product, comprising at least one electric vaporizer, at least one electrical line for supplying the vaporizer with electric current, and a carrier for supporting the vaporizer, comprising the application of an electrically conductive adhesive between the vaporizer and the carrier to form an electrical connection of the vaporizer to the electrical line, wherein an additional (Continued)

heating step is carried out to form a eutectic connection between the vaporizer and the adhesive.

20 Claims, 3 Drawing Sheets

(51) Int. Cl.
*A24F 40/40* (2020.01)
*A24F 40/46* (2020.01)
*C09J 5/06* (2006.01)
*C09J 9/02* (2006.01)
*H05B 3/06* (2006.01)

(52) U.S. Cl.
CPC . *C09J 5/06* (2013.01); *C09J 9/02* (2013.01); *H05B 3/06* (2013.01); *C09J 2479/08* (2013.01); *H05B 2203/016* (2013.01); *H05B 2203/017* (2013.01)

(56) References Cited

U.S. PATENT DOCUMENTS

| | | |
|---|---|---|
| 11,044,950 B2 | 6/2021 | Collett et al. |
| 2018/0015385 A1 | 1/2018 | Meinhart et al. |
| 2020/0040230 A1* | 2/2020 | Vella ................. H01B 1/02 |

FOREIGN PATENT DOCUMENTS

| | | |
|---|---|---|
| CN | 105979614 A | 9/2016 |
| DE | 10 2017 111 119 A1 | 11/2018 |
| EP | 2 892 373 A2 | 7/2015 |
| WO | WO 2014/037794 A2 | 3/2013 |

OTHER PUBLICATIONS

A copy of the Examination Report issued by the Chinese Patent Office dated Jun. 4, 2024 in the parallel Chinese patent application No. 202080028913.8 with an English translation.

* cited by examiner

METHOD FOR PRODUCING A VAPORIZING DEVICE, VAPORIZING DEVICE AND INHALER, PREFERABLY AN ELECTRONIC CIGARETTE PRODUCT

CROSS REFERENCE TO RELATED APPLICATIONS

This application is a National Stage Application of International Application Number PCT/EP2020/057257, filed Mar. 17, 2020; which claims priority to German Patent Application No. 10 2019 109 883.1, filed Apr. 15, 2019.

The present invention relates to a method for manufacturing a vaporizer device for an inhaler, preferably for an electronic cigarette product, comprising at least one electric vaporizer, at least one electrical line for supplying the vaporizer with electric current, and a carrier for supporting the vaporizer. The invention also relates to a vaporizer device and inhaler, preferably an electronic cigarette product.

Conventional electronic cigarette products respectively inhalers are based on the wick-coil technology. Capillary forces transport the liquid from the liquid reservoir along a wick until the liquid is heated by an electrically heatable coil and thus vaporized. The wick serves as a liquid-conducting connection between the liquid reservoir and the heating coil, which serves as the vaporizer.

One disadvantage of wick-coil technology is that a lack of liquid supply leads to local overheating, which can produce pollutants. This so-called "dry puff" must be avoided. In addition, such vaporizer units are often leaky due to the manufacturing process, so that liquid can escape in undesirable ways, for example via the air supply and/or vapor exhaust.

To avoid the problems of wick-coil technology, generic vaporizers are used that make use of the technology disclosed in DE 10 2017 111 119 A1. Here, the liquid is transported by capillary forces from a wick structure in the liquid reservoir to an inlet side of the vaporizer. The vaporizer vaporizes the liquid and the vaporized liquid can be added to an air flow as a vapor and/or aerosol. The vaporizer can be electrically connected to an energy storage device via the electrical line for the supply of electrical energy. However, the electrical and/or mechanical connection or contacting of the vaporizer to, for example, the electrical line and/or the carrier is not described in the cited prior art.

It is the task of the invention to provide an improved contacting of the vaporizer, in particular one that is stable at high temperatures with the lowest possible ohmic resistance.

The invention solves the task with the features of the independent claims.

According to the invention, the method comprises applying an electrically conductive adhesive between the vaporizer and the carrier to form an electrical connection of the vaporizer to the electrical line, wherein an additional heating step is carried out to form a eutectic connection between the vaporizer and the adhesive. The invention has recognized that the electrically conductive adhesive between the vaporizer and the carrier both supports or provides the mechanical connection of the vaporizer to the carrier, even under thermal cycling, and simultaneously provides an electrical connection to the electrical line. Thereby, the electrically conductive adhesive enables effective manufacturing of the vaporizer device.

As a result of the additional heating step according to the invention, the adhesive forms a eutectic connection with the vaporizer in a contact area, which has a lower ohmic resistance than a connection formed solely by adhesive bonding and, if necessary, curing. The eutectic connection between the vaporizer and the adhesive is one in which materials comprising the vaporizer and the adhesive form a eutectic alloy with each other. The electrical resistance of the eutectic connection can be deliberately adjusted via its composition, which enables reproducible electrical connection of the vaporizer to the electrical line (heater chip bonding). In particular, the heating step according to the invention can be additional to typical heating steps for curing the adhesive.

Preferably, the additional heating step is carried out at a temperature of at least 400° C., preferably at least 550° C., further preferably at least 700° C., in order to be able to reliably produce the eutectic connection, the eutectic point of which corresponds to a temperature that is above the temperature occurring during vaporization and, at the same time, low enough that no component of the vaporizer device is damaged during the heating step. In an embodiment involving a silicon-containing vaporizer and a silver-containing adhesive, the additional heating step is performed at a temperature of at least 800° C., for example about 845° C. The temperature corresponding to the eutectic point for forming the eutectic connection applied in the heating step can be influenced by a metal layer applied on the vaporizer.

Preferably, prior to the additional heating step, thermal curing of the adhesive is performed for at least 30 minutes, preferably at least 60 minutes, and/or at a temperature in the range between 150° C. and 290° C. to allow the vaporizer to be electrically connected to the electrical line or to prepare the electrical connection between the vaporizer and the electrical line before the eutectic connection is made. In this way, the positioning of the vaporizer in particular can be ensured before the eutectic connection is made. Temperature-related mechanical stresses that can arise between the vaporizer, the carrier and/or the electrical line during the manufacture of the vaporizer device can thus be minimized. Compared to the heating step, the temperature to be applied for curing can be clearly delimited depending on the adhesive and/or material of the vaporizer, as can also be seen from the advantageous embodiments.

The invention also relates to a vaporizer device for an inhaler, preferably for an electronic cigarette product, comprising at least one electric vaporizer for vaporizing liquid fed to the vaporizer, at least one electrical line for supplying the vaporizer with electric current, and a carrier which holds the vaporizer and in or on which the electrical line is arranged.

In accordance with the invention, it is proposed that an electrically conductive adhesive is provided between the vaporizer and the carrier to form an electrical connection of the vaporizer to the electrical line. The adhesive provided between the vaporizer and the carrier reduces problems due to temperature-induced mechanical stresses between the vaporizer and the electrical line respectively the carrier, which may arise due to the different coefficients of thermal expansion of the different materials forming the basis of the vaporizer, the electrical line respectively the carrier when heated to the operating temperature of the vaporizer and cooled to room temperature.

According to the invention, a eutectic connection is formed between the vaporizer and the adhesive. Thus, the electrical connection between the vaporizer and the electrical line has a low ohmic resistance, while the electrical contact between the vaporizer and the electrical line through the adhesive can have a high ohmic resistance without eutectic connection. The eutectic connection can avoid a high ohmic contact resistance or transition resistance between the vaporizer and the adhesive. Compared to the temperatures encountered during vaporization of liquid in electronic cigarettes, the eutectic connection is highly temperature stable because the temperature of the eutectic connection corresponding to the eutectic point is higher than the vaporization temperature of the liquid.

Advantageously, the adhesive contains metal to provide an electrically conductive and cost-effective adhesive. In particular, silver is advantageous. The adhesive containing silver or metal is temperature stable, which is advantageous for the application for the vaporizer, since the vaporizer is heated during operation to vaporize the liquid. The metal, and in particular the silver, promotes the formation of the eutectic connection and can be effectively provided and applied with an adhesive base, in particular one containing plastic, as an electrically conductive adhesive.

Preferably, the eutectic connection comprises more than 50% by weight, advantageously more than 65% by weight, still further advantageously more than 80% by weight metal, since the eutectic connection has a lower ohmic resistance with an increasing metal content. The eutectic connection may also comprise more than 95% metal by weight, for example a eutectic connection of silver and silicon comprises about 97% silver by weight, implying a particle number fraction of about 89% silver.

Preferably, the electrical line is at least partially formed of the conductive adhesive to provide the carrier with the electrical line in an effective manner. In particular, a portion of the electrical line facing the vaporizer may be formed of the conductive adhesive, and a portion facing away from the vaporizer and intended in particular for contacting an external part, for example an energy storage device, may be formed of a material different from the conductive adhesive. Preferably, the portion facing away from the vaporizer may be formed of gold, copper, and/or another metal or alloy thereof, and may be electrically conductively connected to the portion of the electrical line formed of adhesive and facing the vaporizer. The carrier and/or, in particular, the surface thereof may be pre-structured to allow adhesive to be applied to form the electrical line.

In an advantageous embodiment, an additional metal layer, for example based on aluminum, is applied to the vaporizer in the contact area between the vaporizer and the electrical line, so that the vaporizer can be prepared with electrical contact surfaces that can be connected to the electrical line particularly effectively in the contact area. For example, the vaporizer may substantially comprise a silicon block, in particular a doped silicon block, which comprises the metal layer on the surface. The metal layer can promote the eutectic connection and/or simplifies the electrical and/or material contacting of the vaporizer with the adhesive and/or the electrical line. The application of the metal layer can be carried out by depositing the metal on the vaporizer, which comprises in particular silicon, in the contact area.

Preferably, the carrier is formed of a ceramic material to make the carrier thermally stable for holding the vaporizer and/or, if necessary, to minimize thermal coupling between the vaporizer and the carrier. The ceramic carrier is chemically and mechanically stable to temperatures of, for example, up to 300° C. that occur during operation of the vaporizer and thermal load changes that occur, for example, about 200 to 100000 times in the life cycle of the vaporizer. The carrier is in contact with the liquid and/or the aerosol or vapor and must therefore be food grade or biocompatible, particularly at the temperatures occurring during vaporization, which is favored by the ceramic material. The carrier may be made of a ceramic substrate at least in the area of the vaporizer. Other portions of the carrier not holding and/or contacting the vaporizer may be made of another material, such as a plastic.

BRIEF DESCRIPTION OF THE FIGURES

The invention will be explained below with reference to preferred embodiments with reference to the accompanying figures. Thereby shows FIG. 1 a schematic view of an inhaler.

DETAILED DESCRIPTION

Figure 1:
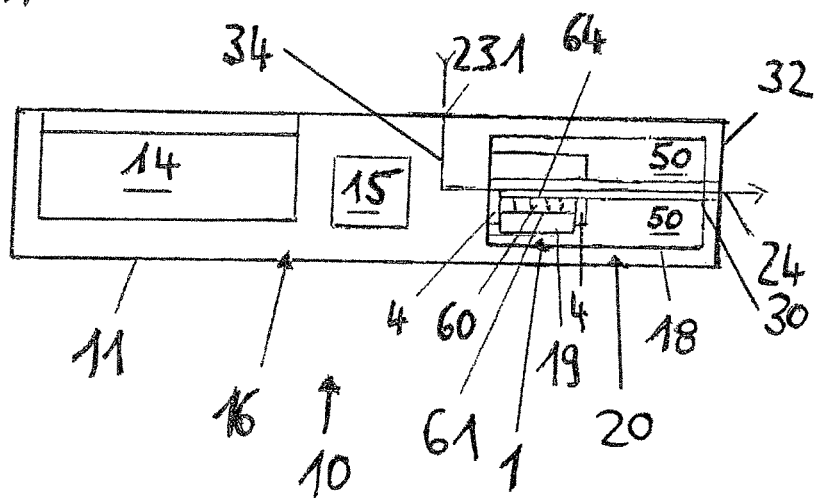

FIG. 1 schematically illustrates an inhaler 10 or electronic cigarette product. The inhaler 10 comprises a housing 11 in which an air channel 30 or vent is provided between at least one air inlet opening 231 and an air outlet opening 24 at a mouth end 32 of the cigarette product 10. The mouth end 32 of the inhaler 10 thereby denotes the end at which the consumer draws for the purpose of inhalation, thereby applying a negative pressure to the inhaler 10 and generating an air flow 34 in the air channel 30.

Advantageously, the inhaler 10 comprises a base portion 16 and a vaporizer tank unit 20 comprising a vaporizer device 1 having a vaporizer 60 and a liquid reservoir 18, and may in particular be in the form of a replaceable cartridge. The liquid reservoir 18 may be refillable by the user of the inhaler 10. Air drawn through the air inlet opening 231 is directed in the air channel 30 to the at least one vaporizer 60. The vaporizer 60 is connected or connectable to the liquid reservoir 18, in which at least one liquid 50 is stored. For this purpose, a porous and/or capillary liquid-conducting wick structure 19 is advantageously arranged at an inlet side 61 of the vaporizer 60.

The vaporizer 60 vaporizes liquid 50 fed to the vaporizer 60 from the liquid reservoir 18 by the wick structure 19 by means of capillary forces, and adds the vaporized liquid as an aerosol/vapor to the air flow 34 at an outlet side 64.

The electronic cigarette 10 further comprises an electrical energy storage device 14 and an electronic control device 15. The energy storage device 14 is generally arranged in the base portion 16 and may be, in particular, a disposable electrochemical battery or a rechargeable electrochemical battery, for example, a lithium-ion battery. The vaporizer tank unit 20 is arranged between the energy storage device 14 and the mouth end 32. The electronic control device 15 comprises at least one digital data processing device, in particular microprocessor and/or microcontroller, in the base portion 16 (as shown in FIG. 1) and/or in the vaporizer tank unit 20.

Advantageously, a sensor, for example a pressure sensor or a pressure or flow switch, is arranged in the housing 11, wherein the control device 15 can determine, based on a sensor signal output by the sensor, that a consumer is drawing at the mouth end 32 of the cigarette product 10 to inhale. In this case, the control device 15 controls the vaporizer 60 to add liquid 50 from the liquid reservoir 18 as an aerosol/vapor into the air flow 34.

The at least one vaporizer 60 is arranged in a portion of the vaporizer tank unit 20 facing away from the mouth end 32. This allows for effective electrical coupling and control of the vaporizer 60, particularly with the base portion 16. Advantageously, the air flow 34 passes through an air channel 30 extending axially through the liquid reservoir 18 to the air outlet opening 24.

The liquid 50 stored in the liquid reservoir 18 to be dispensed is, for example, a mixture of 1,2-propylene glycol, glycerol, water and preferably at least one aroma (flavor) and/or at least one active ingredient, in particular nicotine. However, the listed components of the liquid 50 are not mandatory. In particular, flavoring and/or active ingredients, especially nicotine, may be omitted.

Figure 2:
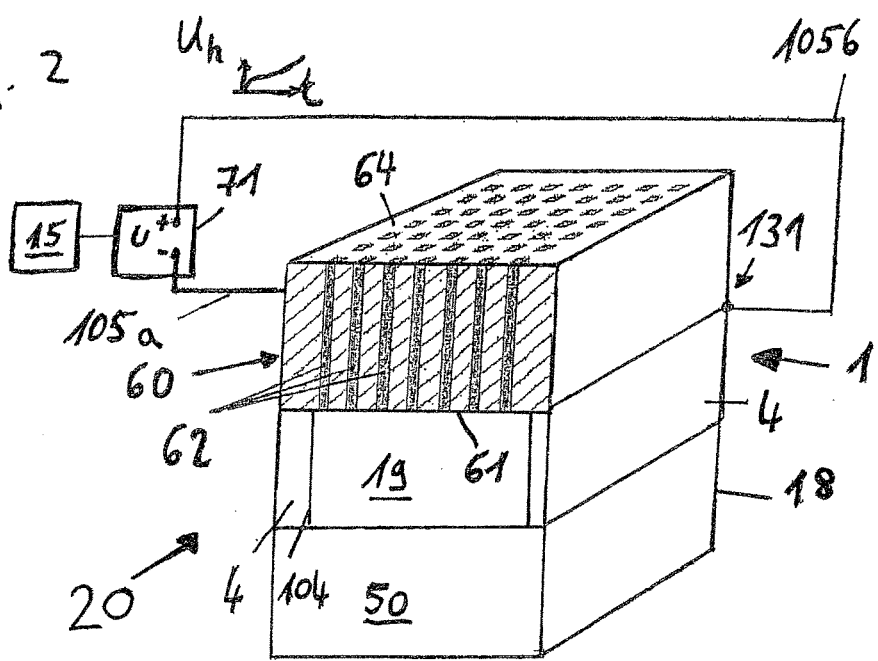
FIG. 2 a perspective section through a vaporizer tank unit.

FIG. 2 shows a perspective section through a schematic vaporizer tank unit 20. The vaporizer tank unit 20 comprises a block-shaped, preferably monolithic heating body respectively vaporizer 60 preferably made of an electrically conductive material, in particular a semiconductor material preferably silicon. It is not necessary that the entire vaporizer 60 is made of an electrically conductive material. It may be sufficient, for example, that the surface of the vaporizer 60 is electrically conductive, for example metallic, coated or preferably suitably doped. In this case, the entire surface need not to be coated; for example, metallic or preferably non-metallic or non-metallically laminated metallic conductor tracks may be provided on a non-conductive or semiconductive base body. It is also not essential that the entire vaporizer 60 heats; for example, it may be sufficient if a section or heating layer of the vaporizer 60 heats in the region of the outlet side 64. The vaporizer 60 is heated by electrical energy based on its electrical resistance, and thus may be referred to as a resistance heater.

Advantageously, the vaporizer 60 is provided with a plurality of microchannels respectively liquid channels 62 which connect an inlet side 61 of the vaporizer 60 to an outlet side 64 of the vaporizer 60 in a liquid-conducting manner.

The average diameter of the liquid channels 62 is preferably in the range between 5 µm and 200 µm, further preferably in the range between 30 µm and 150 µm, still further preferably in the range between 50 µm and 100 µm. Due to these dimensions, a capillary effect is advantageously created so that liquid entering a liquid channel 62 at the inlet side 61 rises upwardly through the liquid channel 62 until the liquid channel 62 is filled with liquid. The number of liquid channels 62 preferably is in the range of four to 1000. In this way, the heat input into the liquid channels 62 can be optimized and an ensured high vaporization performance and a sufficiently large vapor outlet area can be realized.

The liquid channels 62 are advantageously arranged in the form of an array. The array can be in the form of a matrix with s columns and z rows, wherein s advantageously lies in the range between 2 and 50 and further advantageously lies in the range between 3 and 30 and/or z advantageously lies in the range between 2 and 50 and further advantageously lies in the range between 3 and 30.

In this way, an effective and easily producible arrangement of the liquid channels 62 with ensured high vaporization performance can be realized.

The vaporizer tank unit 20 comprises a carrier 4 with a passage opening 104 for liquid-conducting connection of the vaporizer 60 and a liquid reservoir 18. The carrier 4 and the vaporizer 60 are components of a vaporizer device 1 which realizes the electrical and mechanical connection of the vaporizer 60. A wick structure 19 is arranged in the passage opening 104 for supplying liquid 50 to the vaporizer 60.

The inlet side 61 of the vaporizer 60 is connected to the liquid reservoir 18 via the wick structure 19 in a liquid-conducting manner. The wick structure 19 is used to passively feed liquid 50 from the liquid reservoir 18 to the vaporizer 60 by capillary forces. The wick structure 19 advantageously contacts the inlet side 61 of the vaporizer 60 in a planar manner and covers all liquid channels 62 of the vaporizer 60 on the inlet side. On the side opposite the vaporizer 60, the wick structure 19 is connected to the liquid reservoir 18 in a liquid-conducting manner.

An advantageous volume of the liquid reservoir 18 is in the range between 0.1 ml and 5 ml, preferably between 0.5 ml and 3 ml, further preferably between 0.7 ml and 2 ml or 1.5 ml.

The vaporizer tank unit 20 is preferably connected and/or connectable to a heating voltage source 71 controllable by the control device 15, which is connected to the vaporizer 60 via electrical lines 105a, 105b in a contact area 131 at opposite edge sections of the vaporizer 60, so that an electrical voltage Uh generated by the heating voltage source 71 results in a current flow through the vaporizer 60. Due to the ohmic resistance of the electrically conductive vaporizer 60, the current flow causes heating of the vaporizer 60 and therefore vaporization of liquid contained in the liquid channels 62. Vapor/aerosol generated in this manner escapes to the outlet side 64 from the liquid channels 62 and is mixed with the air flow 34. More specifically, upon detecting an air flow 34 through the air channel 30 caused by drawing of the consumer, the control device 15 controls the heating voltage source 71, wherein the liquid contained in the liquid channels 62 is driven out of the liquid channels 62 in the form of vapor/aerosol by spontaneous heating.

The vaporization temperature is preferably in the range between 100° C. and 400° C., more preferably between 150° C. and 350° C., even more preferably between 190° C. and 290° C.

Advantageously, the vaporizer 60 may be fabricated from portions of a wafer using thin film layer technology, which comprises a layer thickness preferably less than or equal to 1000 µm, further preferably 750 µm, still further preferably less than or equal to 500 µm. Surfaces of the vaporizer 60 may advantageously be hydrophilic.

The vaporizer tank unit 20 is adjusted to dispense an amount of liquid preferably in the range between 1 µl and 20 µl, further preferably between 2 µl and 10 µl, still further preferably between 3 µl and 5 µl, typically 4 µl per puff of the consumer. Preferably, the vaporizer tank unit may be adjustable with respect to the amount of liquid/vapor per puff, i.e., from 1 s to 3 s per puff duration.

The drive frequency of the vaporizer 60 generated by the heating voltage source 71 is generally advantageously in the range of 1 Hz to 50 kHz, preferably in the range of 30 Hz to 30 kHz, even more advantageously in the range of 100 Hz to 25 kHz.

The vaporizer 60 is preferably based on MEMS technology, in particular made of silicon, and is therefore advantageously a micro-electro-mechanical system.

Figure 3:
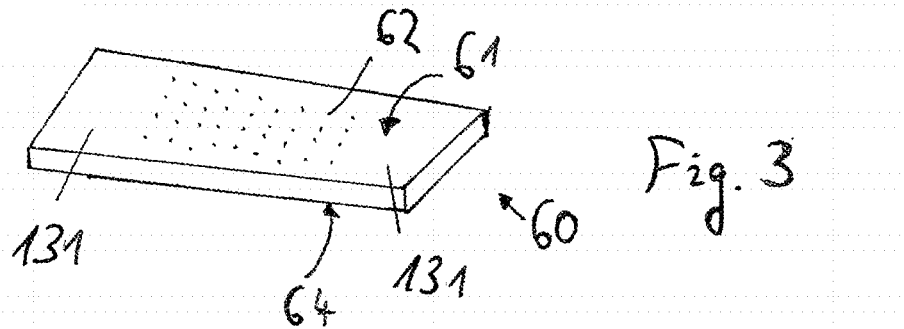
FIG. 3 a schematic perspective view of a vaporizer.

FIG. 3 shows a schematic perspective view of a vaporizer 60. The vaporizer 60 comprises an inlet side 61 and an outlet side 64. A plurality of liquid channels 62 extend between the inlet side 61 and the outlet side 64. The liquid channels 62 are advantageously arranged between edge sections of the vaporizer 60 spaced apart from each other, in which contact areas 131 are provided, in particular for electrical and/or mechanical contacting of the vaporizer 60. The vaporizer 60 is block-shaped or cuboid-shaped, and the liquid channels 62 are thus arranged between two contact areas 131 which are provided on one of the sides of the cuboid-shaped vaporizer 60 and which form the edge sections. In this example, the contact areas 131 are provided in edge sections on the inlet side 61. This allows the vaporizer 60 on the inlet side 61 to be connected to a carrier 4 and/or to provide an electrical connection to an electrical line 105a, 105b. However, in other embodiments, the contact areas 131 may also be provided on another side of the vaporizer 60, in particular on the outlet side 64 opposite the inlet side 61 in this example. It is also conceivable to provide contact areas 131 on one or more sides perpendicular to the inlet side 61 and/or the outlet side 64.

Figure 4:
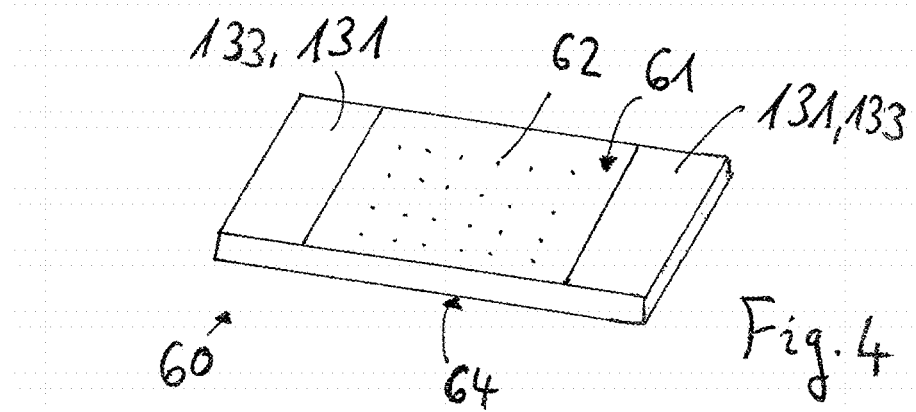
FIG. 4 a schematic perspective view of a vaporizer with a metallization.

FIG. 4 shows a schematic perspective view of a vaporizer 60 with a metallization 133. The embodiment shown in FIG. 4 is explained with respect to the embodiment shown in FIG. 3. The vaporizer comprises a metal layer 133 in the contact area 131 to improve the connection to an adhesive 2 not shown in FIG. 4, in order to increase the electrical conductivity of the contact area 131 and/or to promote a eutectic connection to be formed in a later process step. The metal layer 133 can be deposited on the surface of the vaporizer 60 during the manufacturing process. This allows the electrical connection between the vaporizer 60 and an electrical line 105a, 105b to be made with lower ohmic resistance and more effectively reproducible.

Figure 5:
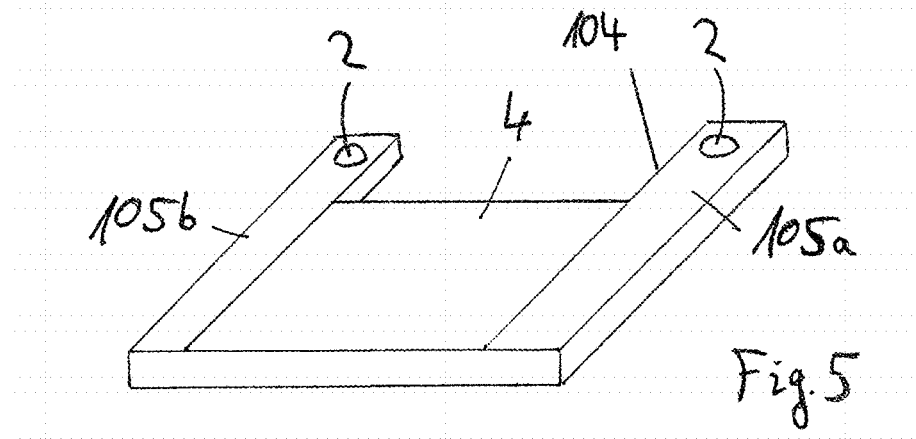
FIG. 5 a schematic perspective view of a carrier.

FIG. 5 shows a schematic perspective view of a carrier 4. Electrical lines 105a, 105b are arranged on the carrier 4. The electrical lines 105a, 105b are arranged such that the vaporizer 60 is connected to the electrical lines 105a, 105b in the contact areas 131 when mounted. In this embodiment, the electrical lines 105a, 105b are arranged on the carrier 4. However, in other embodiments, the electrical lines 105a, 105b may also extend at least partially inside the carrier 4, wherein the electrical lines 105a, 105b must thereby be arranged on the surface of the carrier 4 in sections intended for contacting the vaporizer 60.

In the example shown in FIG. 5, adhesive 2 is applied to both electrical lines 105a, 105b. In this example, the electrical lines 105a, 105b are provided on the surface of the carrier 4. Thus, in the assembled state (see FIG. 6), the adhesive 2 is arranged between the carrier 4 and the vaporizer 60. The adhesive 2 is arranged on the electrical lines 105a, 105b such that the vaporizer 60 can be connected to the electrical lines 105a, 105b by the adhesive 2 in the contact area 131. The distance between the locations where adhesive 2 is applied to the carrier 4 corresponds to the distance between the contact areas 131 of the vaporizer 60.

In this embodiment, a passage opening 104 is provided between the electrical lines 105a, 105b and, in particular, the carrier 4, which allows in particular the inlet side 61 of the vaporizer 60 to be contacted in a liquid-conducting manner by a wick structure 19.

The adhesive may in particular be a silver-filled one-component polyimide adhesive, for example of the type Panacol Ecolite 237. However, adhesives with other plastics as well as a filling with another metal are also conceivable.

The electrical lines 105a, 105b may be applied to the carrier 4 or the carrier 4 may already be provided with electrical lines 105a, 105b pre-structured on the carrier 4. The advantageously pre-structured electrical lines 105a, 105b may be made of different materials or layer combinations of different materials to be temperature stable, low-reactivity, wire bondable and/or solderable. Preferably, electrical lines 105a, 105b are made of gold.

In particular, in the region of the passage opening 104 and/or in the portions of the carrier 4 that contact the vaporizer 60 or that are heated by the vaporizer 60 during operation, the carrier 4 may be made of a ceramic substrate.

Figure 6:
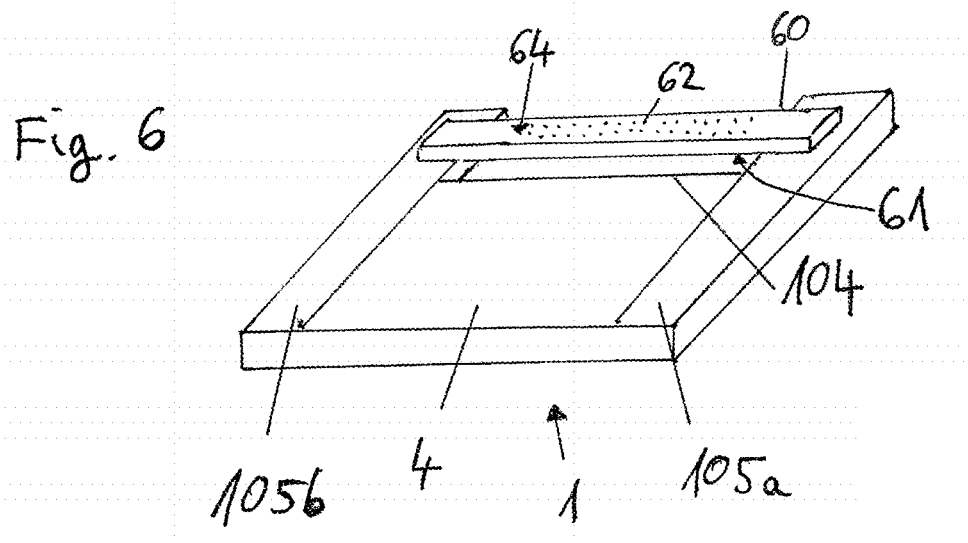
FIG. 6 a schematic perspective view of a vaporizer device.

FIG. 6 shows a schematic perspective view of a vaporizer device 1 comprising the carrier 4 explained with reference to FIG. 5 and the vaporizer 60 explained with reference to FIG. 3 or 4.

The electrical lines 105a, 105b are electrically conductively connected to the vaporizer 60 through the electrically conductive adhesive 2.

For this purpose, an additional heating step creates the eutectic connection to provide low ohmic resistance to the electrical connection between the vaporizer 60 and the electrical lines 105a, 105b.

Exemplarily, a silicon-containing vaporizer 60 and a silver-containing adhesive 2 are provided. It is known to the skilled person that silver and silicon comprise a phase diagram with a eutectic point at a temperature of about 845° C. and a silver content of about 89 atomic % respectively 89 number of particles-%, which corresponds to a silver content of about 97 weight %. Thus, the additional heating step must heat the adhesive 2 to the temperature corresponding to the eutectic point in order to establish the eutectic connection between the vaporizer 60 and the adhesive 2.

Figure 7:
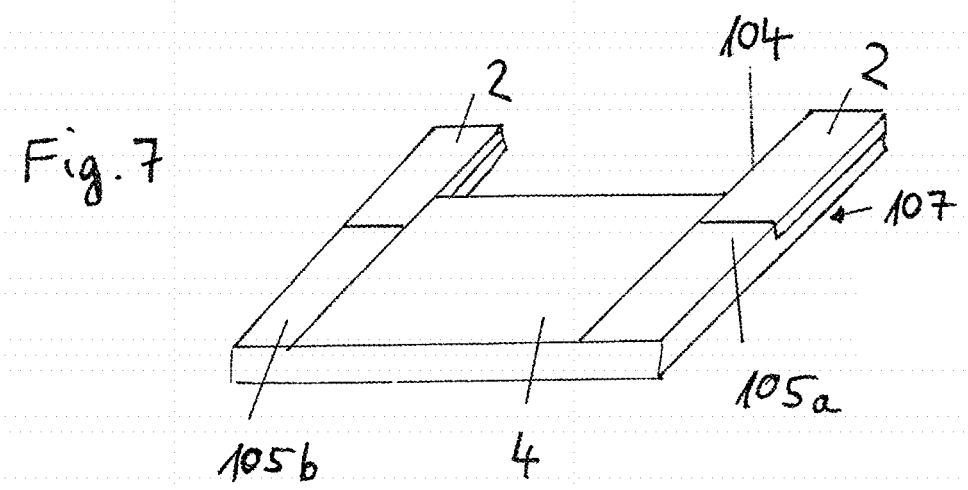
FIG. 7 a schematic perspective view of a carrier in a further embodiment of the invention.

FIG. 7 shows a schematic perspective view of a carrier 4 in another embodiment of the invention in which the electrical lines 105a, 105b are partially formed by the conductive adhesive 2. The carrier 4 may be pre-structured in that the carrier 4 comprises one or more recesses 107 into which adhesive 4 may be applied to form the electrical lines 105a, 105b. The recess 107 is filled with adhesive 2 and then the vaporizer 60 can be placed on the adhesive 2. The recess 107 may facilitate the retainer of the vaporizer 60. The adhesive 2 in the recess 107 forms portions of the electrical lines 105a, 105b contacting the vaporizer 60 and is electrically conductively connected to the portions of the electrical lines 105a, 105b facing away from the vaporizer 60 or not contacting the vaporizer 60. In particular, the portions of the electrical lines 105a, 105b not contacting the vaporizer 60 may protrude beyond the carrier 4, for example, to provide a contact and/or connector for electrically connecting the vaporizer device 1 to an external part (not shown).

In other embodiments, the pre-structuring of the carrier 4 may comprise a surface treatment to allow the adhesive 2 to better bond with the carrier 4 and/or the electrical line 105a, 105b. In this embodiment, a recess 107 may be not required.

EMBODIMENTS

Embodiment 1. Method for manufacturing a vaporizer device (1) for an inhaler (10), preferably for an electronic cigarette product, comprising at least one electric vaporizer (60), at least one electrical line (105a, 105b) for supplying the vaporizer (60) with electric current, and a carrier (4) for supporting the vaporizer (60), characterized in that an electrically conductive adhesive (2) is applied between the vaporizer (60) and the carrier (4) to form an electrical connection of the vaporizer (60) to the electrical line (105a, 105b), wherein an additional heating step is carried out to form a eutectic connection between the vaporizer (60) and the adhesive (2).

Embodiment 2. Method according to embodiment 1, characterized in that the additional heating step is carried out at a temperature of at least 400° C., preferably at least 550° C., further preferably at least 700° C.

Embodiment 3. Method according to one of the preceding embodiments, characterized in that
> prior to the additional heating step, thermal curing of the adhesive (2) is carried out for at least 30 minutes, preferably at least 60 minutes and/or at a temperature in the range between 150° C.and 290° C.

Embodiment 4. Vaporizer device (1) for an inhaler (10), preferably for an electronic cigarette product, comprising
> at least one electric vaporizer (60) for vaporizing liquid (50) fed to the vaporizer (60),
> at least one electrical line (105a, 105b) for supplying the vaporizer (60) with electrical current, and
> a carrier (4) which holds the vaporizer (60) and in or on which the electrical line (105a, 105b) is arranged, characterized in that
> an electrically conductive adhesive (2) is provided between the vaporizer (60) and the carrier (4), which forms an electrical connection of the vaporizer (60) to the electrical line (105a, 105b), wherein
> a eutectic connection is formed between the vaporizer (60) and the adhesive (2).

Embodiment 5. Vaporizer device (1) according to embodiment 4, characterized in that
> the adhesive (2) contains metal, in particular silver.

Embodiment 6. Vaporizer device (1) according to one of embodiments 4 or 5, characterized in that
> the eutectic connection comprises more than 50% by weight, advantageously more than 65% by weight, still further advantageously more than 80% by weight metal.

Embodiment 7. Vaporizer device (1) according to one of embodiments 4 to 6, characterized in that
> the electrical line (105a, 105b) is at least partially formed of the conductive adhesive (2).

Embodiment 8. Vaporizer device (1) according to one of embodiments 4 to 7, characterized in that
> an additional metal layer (133), for example based on aluminum, is applied to the vaporizer (60) in the contact area (131) between the vaporizer (60) and the electrical line (105a, 105b).

Embodiment 9. Vaporizer device (1) according to one of embodiments 4 to 8, characterized in that
> the carrier (4) is formed of a ceramic material.

Embodiment 10. Inhaler (10), in particular electronic cigarette product, comprising a vaporizer device (1) according to any one of embodiments 4 to 9.

LIST OF REFERENCE SIGNS 1 vaporizer device
2 adhesive
4 carrier
10 inhaler
11 housing
14 energy storage device
15 control device
16 base portion
18 liquid reservoir
19 wick structure
20 vaporizer tank unit
24 air outlet opening
30 air channel
32 mouth end
34 air flow
50 liquid
60 vaporizer
61 inlet side
62 liquid channel
64 outlet side
71 heating voltage source
104 passage opening
105a, 105b electrical line
107 recess
131 contact area
133 metal layer
231 air inlet opening

The invention claimed is:

1. A method for manufacturing a vaporizer device for an inhaler, comprising:
   providing at least one electric vaporizer, at least one electrical line for supplying the vaporizer with electric current, and a carrier for supporting the at least one electric vaporizer,
   applying an electrically conductive adhesive between the at least one electric vaporizer and the carrier to form an electrical connection of the at least one electric vaporizer to the at least one electrical line,
   wherein an additional heating step is carried out to form a eutectic connection between the at least one vaporizer and the electrically conductive adhesive, and
   wherein, prior to the additional heating step, thermal curing of the electrically conductive adhesive is carried out for at least 30 minutes and/or at a temperature in the range between 150° C. and 290° C.

2. The method according to claim 1,
   wherein the additional heating step is carried out at a temperature of at least 400° C.

3. The method according to claim 1,
   wherein the additional heating step is carried out at a temperature of at least 550° C.

4. The method according to elaim 3claim 1.
   wherein thermal curing of the electrically conductive adhesive is carried out for at least 30 minutes.

5. The method according to claim 1,
   wherein thermal curing of the electrically conductive adhesive is carried out at a temperature in the range between 150° C. and 290° C.

6. A vaporizer device for an inhaler, comprising:
   at least one electric vaporizer for vaporizing liquid fed to the at least one electric vaporizer,
   at least one electrical line for supplying the at least one electric vaporizer with electrical current, and
   a carrier which holds the at least one electric vaporizer and in or on which the at least one electrical line is arranged,
   wherein an electrically conductive adhesive is provided between the at least one electric vaporizer and the carrier, which forms an electrical connection of the at least one electric vaporizer to the at least one electrical line,
   wherein a eutectic connection is formed between the at least one electric vaporizer and the electrically conductive adhesive, and
   wherein the at least one electrical line is at least partially formed of the electrically conductive adhesive.

7. The vaporizer device according to claim 6,
   wherein the electrically conductive adhesive comprises metal.

8. The vaporizer device according to claim 6,
   wherein the eutectic connection comprises more than 50% by weight metal.

9. The vaporizer device according to claim 8,
   wherein the eutectic connection comprises more than 67% by weight metal.

10. The vaporizer device according to claim 6,
wherein an additional metal layer is applied to the at least one electric vaporizer in a contact area between the at least one electric vaporizer and the at least one electrical line.

11. The vaporizer device according to claim 6,
wherein the carrier is formed of a ceramic material.

12. The vaporizer device according to claim 6,
wherein the vaporizer device is for an inhaler for an electronic cigarette product.

13. An inhaler, comprising:
a vaporizer device according to claim 6.

14. A vaporizer device for an inhaler, comprising:
at least one electric vaporizer for vaporizing liquid fed to the at least one electric vaporizer,
at least one electrical line for supplying the at least one electric vaporizer with electrical current, and
a carrier which holds the at least one electric vaporizer and in or on which the at least one electrical line is arranged,
wherein an electrically conductive adhesive is provided between the at least one electric vaporizer and the carrier, which forms an electrical connection of the at least one electric vaporizer to the at least one electrical line,
wherein a eutectic connection is formed between the at least one electric vaporizer and the electrically conductive adhesive,
wherein the at least one electrical line is at least partially formed of the electrically conductive adhesive, and
wherein an additional metal layer is applied to the at least one electric vaporizer in a contact area between the at least one electric vaporizer and the at least one electrical line.

15. The vaporizer device according to claim 14,
wherein the electrically conductive adhesive comprises metal.

16. The vaporizer device according to claim 14, wherein the at least one electrical line is at least partially formed of the electrically conductive adhesive.

17. The vaporizer device according to claim 14,
wherein the carrier is formed of a ceramic material.

18. The vaporizer device according to claim 14,
wherein the vaporizer device is for an inhaler for an electronic cigarette product.

19. An inhaler, comprising:
a vaporizer device according to claim 14.

20. The inhaler according to claim 19,
wherein the inhaler is for an electronic cigarette product.

* * * * *